(12) United States Patent
Yanagida et al.

(10) Patent No.: US 10,777,875 B2
(45) Date of Patent: *Sep. 15, 2020

(54) DETECTION DEVICE AND DETECTION SYSTEM

(71) Applicant: Yazaki Corporation, Tokyo (JP)

(72) Inventors: You Yanagida, Shizuoka (JP); Ryoma Toyoda, Shizuoka (JP)

(73) Assignee: YAZAKI CORPORATION, Minato-ku, Tokyo (JP)

(*) Notice: Subject to any disclaimer, the term of this patent is extended or adjusted under 35 U.S.C. 154(b) by 112 days.

This patent is subject to a terminal disclaimer.

(21) Appl. No.: 16/147,984

(22) Filed: Oct. 1, 2018

(65) Prior Publication Data

US 2019/0103651 A1 Apr. 4, 2019

(30) Foreign Application Priority Data

Oct. 4, 2017 (JP) ................. 2017-194547

(51) Int. Cl.
*H01Q 7/00* (2006.01)
*H01Q 1/22* (2006.01)
*G06K 19/07* (2006.01)
*B60R 22/48* (2006.01)
*B60R 21/015* (2006.01)
*B60R 16/023* (2006.01)

(52) U.S. Cl.
CPC ....... *H01Q 1/2216* (2013.01); *B60R 16/0232* (2013.01); *B60R 21/01546* (2014.10); *B60R 22/48* (2013.01); *G06K 19/0723* (2013.01); *B60R 2022/4816* (2013.01); *H01Q 7/00* (2013.01)

(58) Field of Classification Search
CPC ........ H01Q 1/2216; H01Q 7/00; B60R 22/48
USPC ...................................................... 340/540
See application file for complete search history.

(56) References Cited

U.S. PATENT DOCUMENTS

| | | | |
|---|---|---|---|
| 4,442,434 A * | 4/1984 | Baekgaard | H01Q 7/00 343/701 |
| 8,988,211 B2 * | 3/2015 | Masudaya | B60R 16/0232 340/10.1 |
| 9,131,001 B2 * | 9/2015 | Cherian | H04L 69/22 |

(Continued)

FOREIGN PATENT DOCUMENTS

| | | |
|---|---|---|
| JP | 2013-049290 A | 3/2013 |
| JP | 2013-244766 A | 12/2013 |

(Continued)

*Primary Examiner* — Kam Wan Ma
(74) *Attorney, Agent, or Firm* — Sughrue Mion, PLLC

(57) ABSTRACT

A loop antenna transmits and receives a radio wave including a signal. A RFID detection circuit includes a circuit terminal and a circuit terminal connected with the loop antenna. A switch circuit switches, according to a state of an object to be detected, between a gain reduced state in which a gain of the loop antenna is reduced and a gain unreduced state in which the gain of the loop antenna is not reduced. The switch circuit has a first point of action and a second point of action for reducing the gain of the loop antenna, when λ is a wavelength of the radio wave, the point of action is located within a gain reduction range that represents a range on the loop antenna from the circuit terminal to a position of λ/32 away from the circuit terminal in a direction in which the loop antenna extends.

18 Claims, 13 Drawing Sheets

(56) References Cited

U.S. PATENT DOCUMENTS

| | | | | |
|---|---|---|---|---|
| 9,800,061 | B2* | 10/2017 | Takahashi | H02J 50/80 |
| 2009/0308936 | A1* | 12/2009 | Nitzan | H01Q 1/2225 |
| | | | | 235/492 |
| 2010/0245039 | A1* | 9/2010 | Tokunaga | G07C 9/00309 |
| | | | | 340/5.61 |
| 2011/0025265 | A1* | 2/2011 | Mochida | H01M 10/44 |
| | | | | 320/108 |
| 2012/0326524 | A1* | 12/2012 | Matsumoto | H01M 10/425 |
| | | | | 307/104 |
| 2013/0080650 | A1* | 3/2013 | Cherian | H04L 45/00 |
| | | | | 709/230 |
| 2013/0241654 | A1* | 9/2013 | Mikhemar | H03G 1/0029 |
| | | | | 330/278 |
| 2013/0314223 | A1 | 11/2013 | Masudaya et al. | |
| 2016/0087448 | A1 | 3/2016 | Takahashi et al. | |
| 2016/0118811 | A1* | 4/2016 | Eguchi | B60L 53/12 |
| | | | | 307/104 |
| 2019/0103651 | A1* | 4/2019 | Yanagida | B60R 16/0232 |
| 2019/0362112 | A1* | 11/2019 | Yamamoto | H01Q 1/2208 |

FOREIGN PATENT DOCUMENTS

| | | |
|---|---|---|
| JP | 2014-212663 A | 11/2014 |
| JP | 2016-66960 A | 4/2016 |

* cited by examiner

DETECTION DEVICE AND DETECTION SYSTEM

CROSS-REFERENCE TO RELATED APPLICATION(S)

The present application claims priority to and incorporates by reference the entire contents of Japanese Patent Application No. 2017-194547 filed in Japan on Oct. 4, 2017.

BACKGROUND OF THE INVENTION

1. Field of the Invention

The present invention relates to a detection device and a detection system.

2. Description of the Related Art

Japanese Patent Application Laid-open No. 2013-244766, for example, discloses as a detection device, a seat belt-side device that detects fastening and unfastening of a seat belt on a vehicle. The seat belt-side device is disposed at a buckle unit. When a tongue unit of the seat belt is fastened to the buckle unit, a detection switch is turned on and the seat belt-side device transmits a seat belt fastened signal.

The seat belt-side device disclosed in Japanese Patent Application Laid-open No. 2013-244766 needs further improvement in the point that the seat belt-side device erroneously detects a seat belt fastened signal that may be transmitted, for example, even when the tongue unit of the seat belt is not fastened to the buckle unit and the detection switch is off.

SUMMARY OF THE INVENTION

The present invention has been made in view of the foregoing situation and it is an object of the present invention to provide a detection device and a detection system that can enhance detection accuracy.

In order to solve the above mentioned problem and achieve the object, a detection device according to one aspect of the present invention includes an antenna that transmits and receives a radio wave including a signal; a signal output unit that includes a circuit terminal connected with the antenna, the signal output unit being activated with power derived from a power supply signal included in the signal received by the antenna to output a detection signal to the antenna; and a gain reduction unit that switches, according to a state of an object to be detected, between a gain reduced state in which a gain of the antenna is reduced and a gain unreduced state in which the gain of the antenna is not reduced, wherein the gain reduction unit has a point of action for reducing the gain of the antenna, when $\lambda$ is a wavelength of the radio wave, the point of action is located within a gain reduction range that represents a range on the antenna and that extends from the circuit terminal to a position of $\lambda/32$ away from the circuit terminal along a direction in which the antenna extends.

According to another aspect of the present invention, in the detection device, it is preferable that the gain reduction unit includes a gain reduction circuit that allows a first point of action and a second point of action as the point of action to be mutually switched between an electrically connected state and an electrically disconnected state, and the gain reduction circuit is able to switch between the gain unreduced state in which the first point of action and the second point of action are in the connected state and the gain reduced state in which the first point of action and the second point of action are in the disconnected state.

According to still another aspect of the present invention, in the detection device, it is preferable that the gain reduction unit includes a gain reduction circuit that is able to connect an electronic device capable of reducing the gain of the antenna with the point of action, and the gain reduction circuit is able to switch between the gain unreduced state in which the electronic device is not connected with the point of action and the gain reduced state in which the electronic device is connected with the point of action.

According to sill another aspect of the present invention, in the detection device, it is preferable that the gain reduction unit includes a gain reduction circuit that is able to connect a ground with the point of action, and the gain reduction circuit is able to switch between the gain unreduced state in which the ground is not connected with the point of action and the gain reduced state in which the ground is connected with the point of action.

According to still another aspect of the present invention, in the detection device, it is preferable that the gain reduction circuit includes a point-of-action terminal to be connected with the point of action, and the gain reduction unit directly connects the point of action with the point-of-action terminal.

According to still another aspect of the present invention, in the detection device, it is preferable that the gain reduction circuit includes a point-of-action terminal to be connected with the point of action, the gain reduction unit includes a wire that is able to connect the point of action with the point-of-action terminal and the gain reduction unit is able to switch between the gain reduced state and the gain unreduced state on a side opposite to the point of action of the wire through the gain reduction circuit, and the wire includes a plurality of current paths and at least part of magnetic fluxes produced by currents flowing through the current paths are canceled each other.

According to still another aspect of the present invention, in the detection device, it is preferable that the gain reduction circuit includes a point-of-action terminal to be connected with the point of action, the gain reduction unit includes a wire that is able to connect the point of action with the point-of-action terminal and the gain reduction unit is able to switch between the gain reduced state and the gain unreduced state on a side opposite to the point of action of the wire through the gain reduction circuit, and the wire includes a core wire through which a current flows and a shield that shields a magnetic flux affecting the core wire.

According to still another aspect of the present invention, in the detection device, it is preferable that the gain reduction unit is disposed in a vehicle and, according to a state of an object to be detected within the vehicle, switches between the gain reduced state and the gain unreduced state.

In order to achieve the object, an detection system according to still another aspect of the present invention includes a reader that transmits and receives a radio wave including a signal and transmits a transmission signal including at least a power supply signal; a detection device including: an antenna that transmits and receives a signal to and from the reader; a signal output unit including a circuit terminal connected with the antenna, the signal output unit being activated with power derived from the power supply signal included in the transmission signal received by the antenna to output a detection signal to the antenna; and a gain reduction unit that switches, according to a state of an object to be detected, between a gain reduced state in which a gain of the antenna is reduced and a gain unreduced state in which the gain of the antenna is not reduced; and a determiner that is connected with the reader and determines a state of the objected to be detected with the detection signal received by the reader, wherein the gain reduction unit has a point of action for reducing the gain of the antenna, when λ is a wavelength of the radio wave, the point of action is located within a gain reduction range that represents a range on the antenna and that extends from the circuit terminal to a position of λ/32 away from the circuit terminal along a direction in which the antenna extends.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The following details, with reference to the accompanying drawings, an embodiment for carrying out the invention. The contents described in the following embodiment do not limit the present invention. The elements described hereunder include those that can be easily conceived by those skilled in the art and those that are substantially identical to each other. Furthermore, the configurations described hereunder may be combined with each other as appropriate. Various omissions, substitutions, and changes of the configurations described herein may be made without departing from the spirit of the invention.

First Embodiment

The following describes a detection system 1 including a detection device 20 according to a first embodiment. The detection system 1 is disposed in a vehicle 2 and determines, for example, a state of an object to be detected within the vehicle 2. The detection system 1 determines, for example, an operation of an occupant through, for example, seating by the occupant; however, the determination is not limited thereto. The following details the detection system 1.

Figure 1:
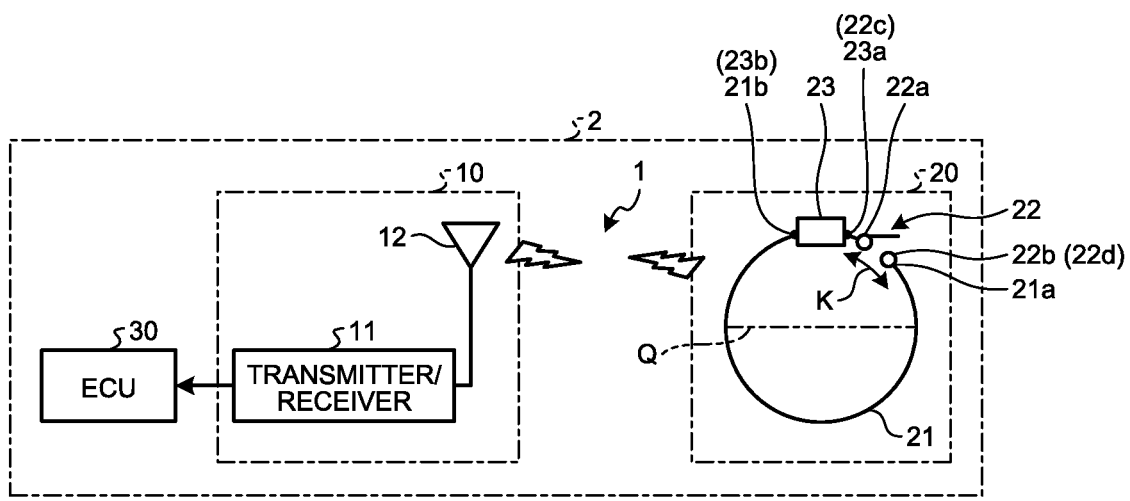
FIG. 1 is a schematic diagram of an exemplary configuration of a detection system according to an embodiment.

As illustrated in FIG. 1, the detection system 1 includes a radio frequency identifier (RFID) reader 10, a plurality of the detection devices 20, and an electronic control unit (ECU) 30. The RFID reader 10 serves as a reader. The ECU 30 serves as a determiner. It is noted that the detection system 1 performs near field wireless communication using a communication technique such as RFID and near field communication (NFC). It is noted that the RFID and NFC are illustrative only and the detection system 1 may use any other near field wireless communication technique. In near field wireless communication, the detection system 1, for example, performs communication through a radio wave system that performs modulation and demodulation in response to the communication radio waves.

Figure 2:
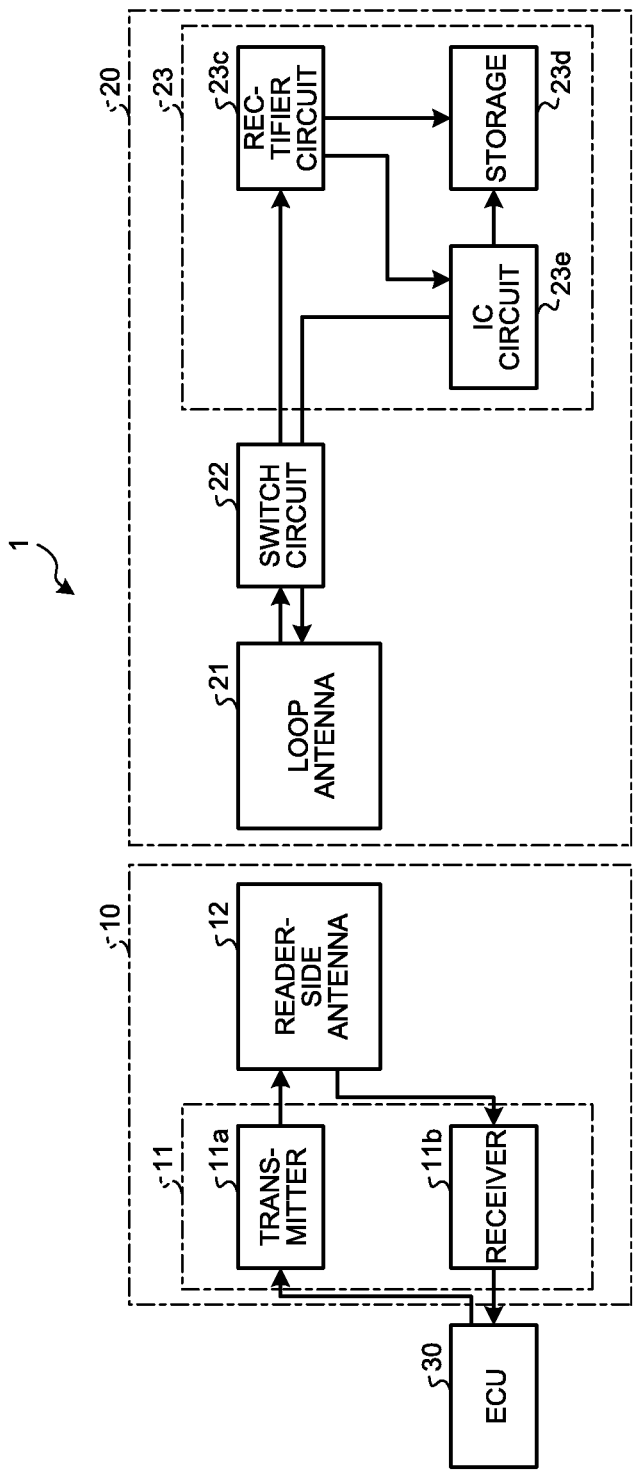
FIG. 2 is a block diagram of the exemplary configuration of the detection system according to the embodiment.

The RFID reader 10 transmits and receives signals. The RFID reader 10 is disposed in the vehicle 2; for example, in an AV console, a meter, a room lamp, a window glass, or a sunroof. The RFID reader 10 transmits, for example, a transmission signal including a power supply signal and a carrier wave that allows each of the detection devices 20 to carry a signal. The RFID reader 10 also receives a detection signal from each of the detection devices 20. As illustrated in FIG. 2, the RFID reader 10 includes a transmitter/receiver 11 and a reader-side antenna 12. The transmitter/receiver 11 includes a transmitter 11a and a receiver 11b.

The transmitter 11a is connected with the reader-side antenna 12 and transmits a radio wave including a signal. For example, the transmitter 11a outputs to the reader-side antenna 12 a transmission signal including a power supply signal and a carrier wave that allows each of the detection devices 20 to carry a signal. It is noted that the transmission signal may include, in addition to the power supply signal and the carrier wave, a command signal as a command.

The receiver 11b is connected with the reader-side antenna 12 and receives a radio wave including a signal. The receiver 11b receives the detection signal transmitted from each of the detection devices 20 via the reader-side antenna 12. The receiver 11b demodulates the received detection signal and outputs the demodulated signal to the ECU 30.

The reader-side antenna 12 transmits and receives a radio wave including a signal. The reader-side antenna 12 is connected with the transmitter 11a and transmits the transmission signal including the power supply signal and the carrier wave output from the transmitter 11a to each of the detection devices 20. The reader-side antenna 12 also receives a detection signal from each of the detection devices 20 and outputs the received detection signal to the receiver 11b.

Figure 3:
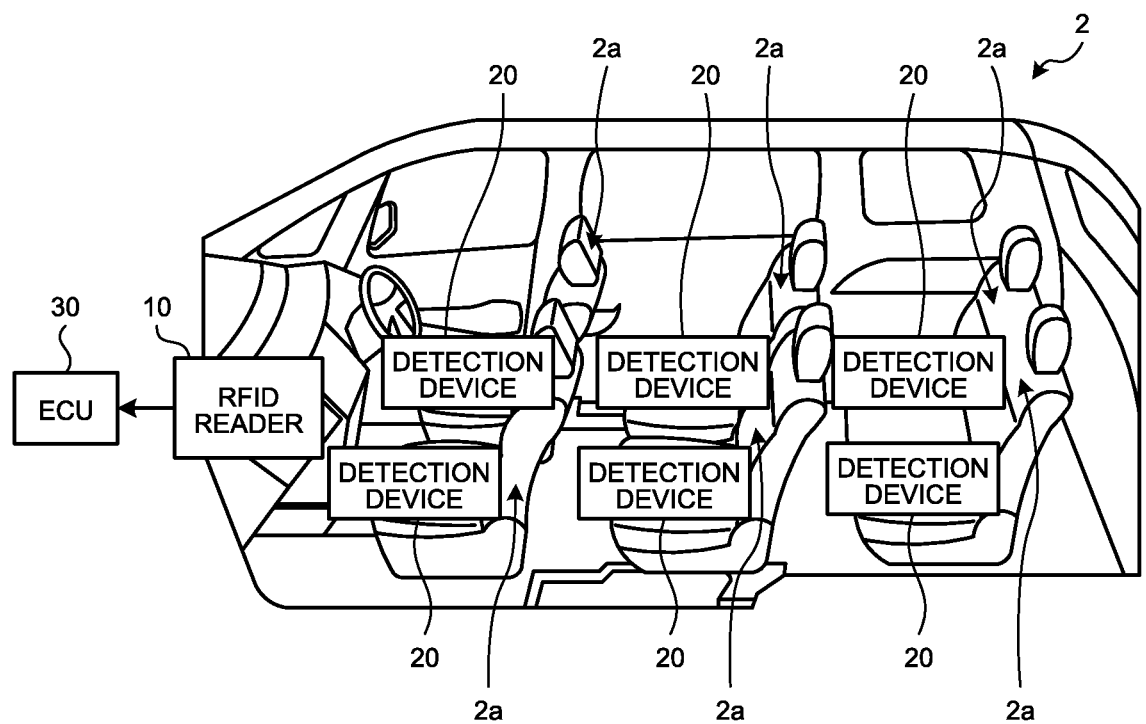
FIG. 3 is a schematic diagram of exemplary installation of the detection system according to the embodiment.
Figure 4:
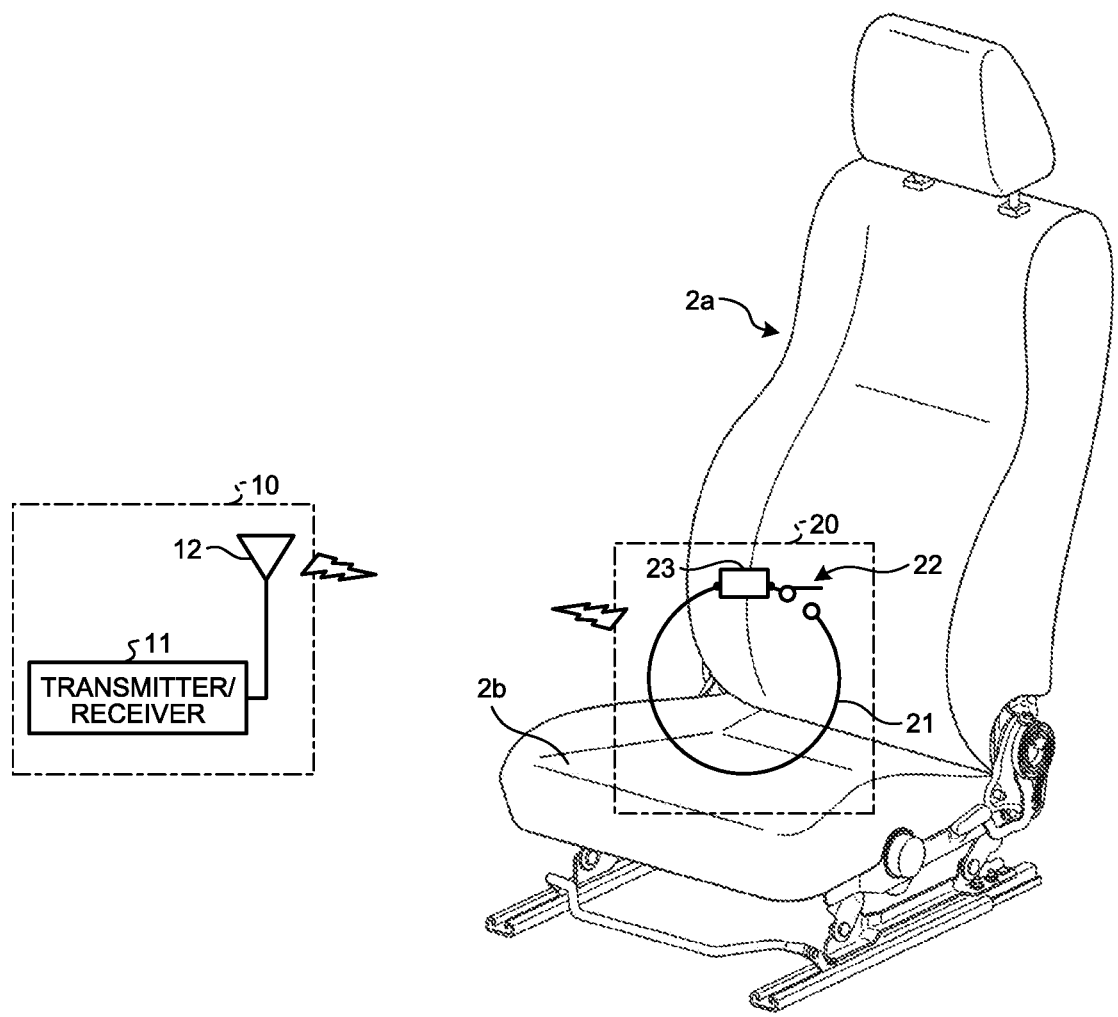
FIG. 4 is a schematic diagram of exemplary installation of a detection device according to the embodiment.

The detection devices 20 are each disposed in the vehicle 2 and each transmit a detection signal to the RFID reader 10. The detection device 20 is not provided with a battery. The detection device 20 is an device incorporating passive RFID activated with power derived from a power supply signal (referred to also as electricity) from the RFID reader 10. The detection devices 20 are each disposed in respective different places in the vehicle 2. For example, as illustrated in FIGS. 3 and 4, the detection devices 20 are disposed in respective seats 2a of the vehicle 2. For example, each of the detection devices 20 is disposed in a seat cushion 2b of each of the seats 2a.

The detection devices 20 each include a loop antenna 21, a switch circuit 22, and an RFID detection circuit 23. The loop antenna 21 serves as an antenna. The switch circuit 22 serves as a gain reduction circuit. The RFID detection circuit 23 serves as a signal output unit. The loop antenna 21 transmits and receives a signal to and from the RFID reader 10. The loop antenna 21 includes a conductor wound annularly once or a plurality of times. The loop antenna 21 includes a starting end 21a and a terminating end 21b. The starting end 21a represents a winding starting side. The terminating end 21b represents a winding terminating side. Exemplarily, the loop antenna 21 has the starting end 21a connected with a second terminal 22b of the switch circuit 22 to be described later, and the loop antenna 21 has the terminating end 21b connected with a circuit terminal 23b of the RFID detection circuit 23. Specifically, the loop antenna 21 is connected with the RFID detection circuit 23 via the switch circuit 22. When the switch circuit 22 is in a connected state (ON), the loop antenna 21 receives a transmission signal including a power supply signal and a carrier wave transmitted from the RFID reader 10 and outputs the received transmission signal to the RFID detection circuit 23 via the switch circuit 22. The loop antenna 21 transmits to the RFID reader 10 a detection signal output via the switch circuit 22 from the RFID detection circuit 23. When the switch circuit 22 is in a disconnected state (OFF), the loop antenna 21 does not receive the transmission signal including a power supply signal and a carrier wave transmitted from the RFID reader 10.

The switch circuit 22 turns ON or OFF an electric connection. The switch circuit 22 is disposed between the RFID detection circuit 23 and the loop antenna 21. The switch circuit 22 includes a first terminal 22a and the second terminal 22b. The first terminal 22a and the second terminal 22b serve as point-of-action terminals. The switch circuit 22 brings the first terminal 22a and the second terminal 22b into an electrically connected state (ON) or an electrically disconnected state (OFF). The switch circuit 22 has the first terminal 22a directly connected to a circuit terminal 23a of the RFID detection circuit 23 and has the second terminal 22b directly connected to the starting end 21a of the loop antenna 21. In this case, the circuit terminal 23a of the RFID detection circuit 23 assumes a first point of action 22c for reducing a gain of the loop antenna 21 and the starting end 21a of the loop antenna 21 assumes a second point of action 22d for reducing the gain of the loop antenna 21.

The switch circuit 22 brings the loop antenna 21 into a gain reduced state to thereby reduce reception sensitivity by switching the first terminal 22a and the second terminal 22b into the electrically disconnected state (OFF) depending on the state of the object to be detected within the vehicle 2. Specifically, the switch circuit 22 turns OFF the first terminal 22a and the second terminal 22b to thereby develop a mismatch state of antenna matching between the RFID detection circuit 23 and the loop antenna 21. To state the foregoing differently, the switch circuit 22 turns OFF the first terminal 22a and the second terminal 22b to thereby make impedance mismatch between the RFID detection circuit 23 and the loop antenna 21. As a result, the detection device 20 can cause the RFID detection circuit 23 not to be activated because of reduced reception sensitivity. The switch circuit 22 may bring the loop antenna 21 into a gain unreduced state by switching ON the first terminal 22a and the second terminal 22b depending on the state of the object to be detected within the vehicle 2. Specifically, the switch circuit 22 turns ON the first terminal 22a and the second terminal 22b to thereby develop a match state of antenna matching between the RFID detection circuit 23 and the loop antenna 21. To state the foregoing differently, the switch circuit 22 turns ON the first terminal 22a and the second terminal 22b to thereby make impedance match between the RFID detection circuit 23 and the loop antenna 21. Thus, the detection device 20 can activate the RFID detection circuit 23 with the power supply signal from the RFID reader 10 because of the unreduced reception sensitivity.

The switch circuit 22 includes the first terminal 22a and the second terminal 22b. For example, when $\lambda$ is a wavelength of the radio wave transmitted and received by the loop antenna 21, the first terminal 22a and the second terminal 22b are intended for reducing gain within a gain reduction range K on the loop antenna 21. The gain reduction range K extends from the circuit terminal 23a of the RFID detection circuit 23 to a position of $\lambda/32$ away from the circuit terminal 23a in a direction in which the loop antenna 21 extends. The switch circuit 22, because bringing the RFID detection circuit 23 and the loop antenna 21 into a disconnected state through the first terminal 22a and the second terminal 22b disposed within the gain reduction range K, can effectively reduce the gain of the loop antenna 21. The following describes, with reference to FIGS. 5 to 12, a reason why the gain reduction range K is a range on the loop antenna 21 from the circuit terminal 23a to the position of $\lambda/32$ away from the circuit terminal 23a along the direction in which the loop antenna 21 extends. Change in electric field intensity of the loop antenna 21 has been verified when the first terminal 22a and the second terminal 22b are turned OFF at various positions of the first terminal 22a and the second terminal 22b of the switch circuit 22 (disconnected position of the loop antenna 21) as candidates for the gain reduction range K. In each of FIGS. 5 to 12, the abscissa represents a diameter of the loop antenna 21 and the ordinate represents the electric field intensity of the loop antenna 21. FIGS. 5 to 12 represent results of simulation when the RFID frequency is 920 MHz and the loop antenna 21 has a diameter of 102 mm. FIGS. 5 to 12 represent the results of simulation of the electric field intensity inside the loop antenna 21 in a plane of the loop antenna 21 cut by a line segment (diameter) Q illustrated in FIG. 1.

Figure 5:
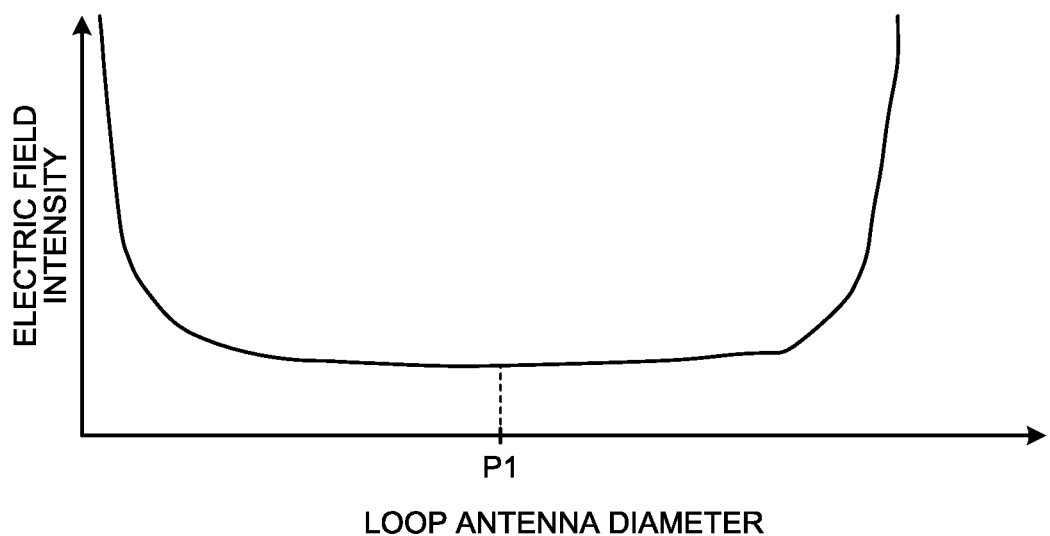
FIG. 5 is a diagram of a relation between an electric connection and electric field intensity of a loop antenna according to the embodiment.

FIG. 5 indicates electric field intensity in a configuration in which the loop antenna 21 does not include the first terminal 22a or the second terminal 22b. Specifically, FIG. 5 indicates the electric field intensity when the loop antenna 21 is electrically connected with the detection device 20. According to FIG. 5, the loop antenna 21 exhibits the greatest electric field intensity having a value of 135.64 V/m at a center P1 of the line segment Q.

Figure 6:
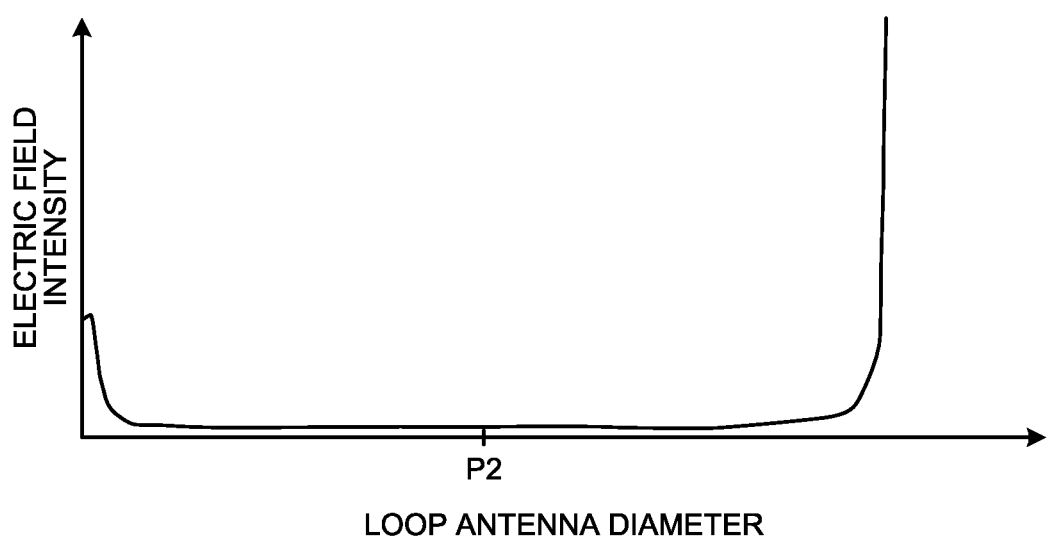
FIG. 6 is a diagram of a relation between an electric connection and electric field intensity of the loop antenna according to the embodiment.

FIG. 6 indicates electric field intensity when the first terminal 22a and the second terminal 22b are turned OFF in a configuration in which the first terminal 22a and the second terminal 22b are disposed between the circuit terminal 23a of the RFID detection circuit 23 and the starting end 21a of the loop antenna 2'. According to FIG. 6, the loop antenna 21 exhibits the smallest electric field intensity having a value of 15.79 V/m at a center P2 of the line segment Q. This is because the loop antenna 21 is brought into the disconnected state by the switch circuit 22 at a position closest to the RFID detection circuit 23.

Figure 7:
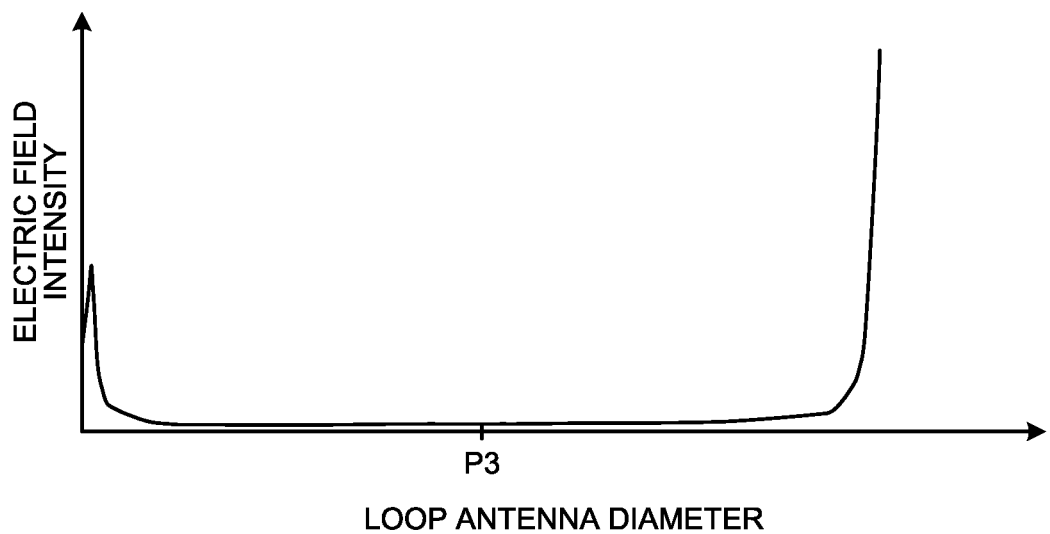
FIG. 7 is a diagram of a relation between an electric connection and electric field intensity of the loop antenna according to the embodiment.

FIG. 7 indicates electric field intensity when the first terminal 22a and the second terminal 22b are turned OFF in a configuration in which the first terminal 22a or the second terminal 22b is disposed at a position of $\lambda/128$ (3 mm) away from the circuit terminal 23a of the RFID detection circuit 23 in the direction in which the loop antenna 21 extends. According to FIG. 7, the loop antenna 21 exhibits electric field intensity having a value of 16.06 V/m at a center P3 of the line segment Q, which is greater than the electric field intensity value in the example of FIG. 6. This is because the loop antenna 21 is brought into the disconnected state by the switch circuit 22 at a position farther away from the circuit terminal 23a of the RFID detection circuit 23 than in the example of FIG. 6.

Figure 8:
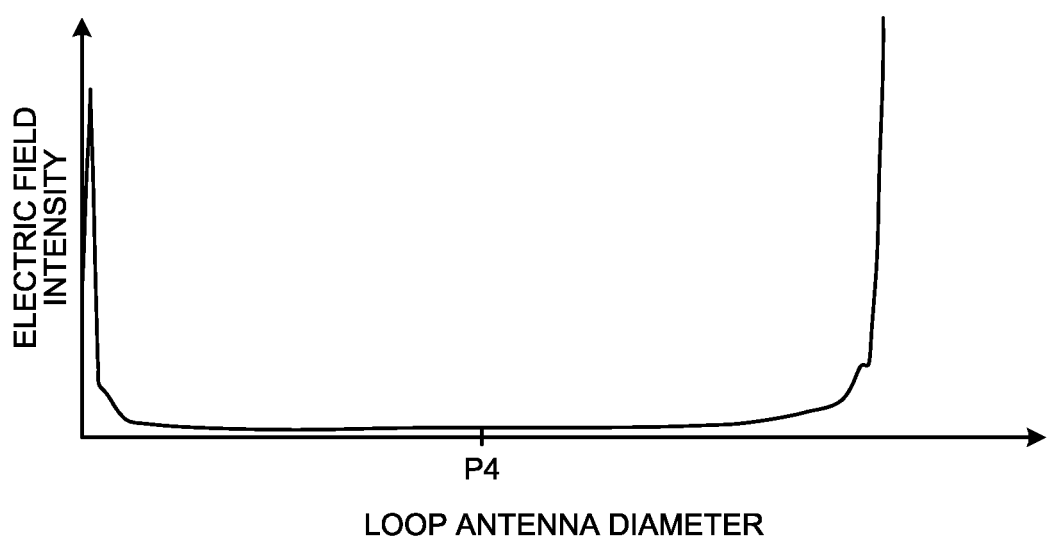
FIG. 8 is a diagram of a relation between an electric connection and electric field intensity of the loop antenna according to the embodiment.

FIG. 8 indicates electric field intensity when the first terminal 22a and the second terminal 22b are turned OFF in a configuration in which the first terminal 22a or the second terminal 22b is disposed at a position of $\lambda/64$ (6 mm) away from the circuit terminal 23a of the RFID detection circuit 23 in the direction in which the loop antenna 21 extends. According to FIG. 8, the loop antenna 21 exhibits electric field intensity having a value of 19.62 V/m at a center P4 of the line segment Q, which is greater than the electric field intensity values in the examples of FIGS. 6 and 7. This is because the loop antenna 21 is brought into the disconnected state by the switch circuit 22 at a position farther away from the circuit terminal 23a of the RFID detection circuit 23 than in the examples of FIGS. 6 and 7.

Figure 9:
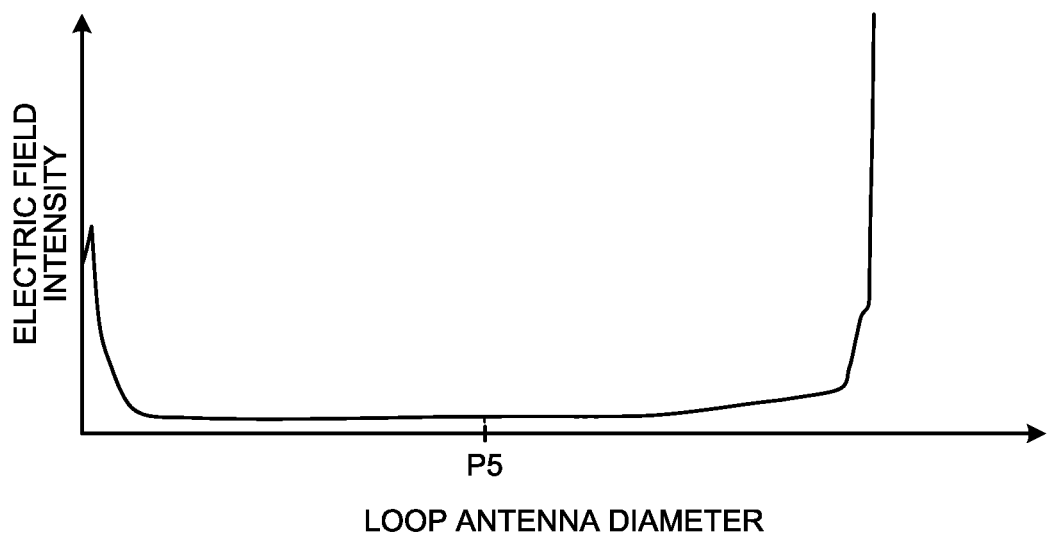
FIG. 9 is a diagram of a relation between an electric connection and electric field intensity of the loop antenna according to the embodiment.

FIG. 9 indicates electric field intensity when the first terminal 22a and the second terminal 22b are turned OFF in a configuration in which the first terminal 22a or the second terminal 22b is disposed at a position of $\lambda/32$ (12 mm) away from the circuit terminal 23a of the RFID detection circuit 23 in the direction in which the loop antenna 21 extends. According to FIG. 9, the loop antenna 21 exhibits electric field intensity having a value of 34.87 V/m at a center P5 of the line segment Q, which is greater than the electric field intensity values in the examples of FIGS. 6 to 8. This is because the loop antenna 21 is brought into the disconnected state by the switch circuit 22 at a position farther away from the circuit terminal 23a of the RFID detection circuit 23 than in the examples of FIGS. 6 to 8.

Figure 10:
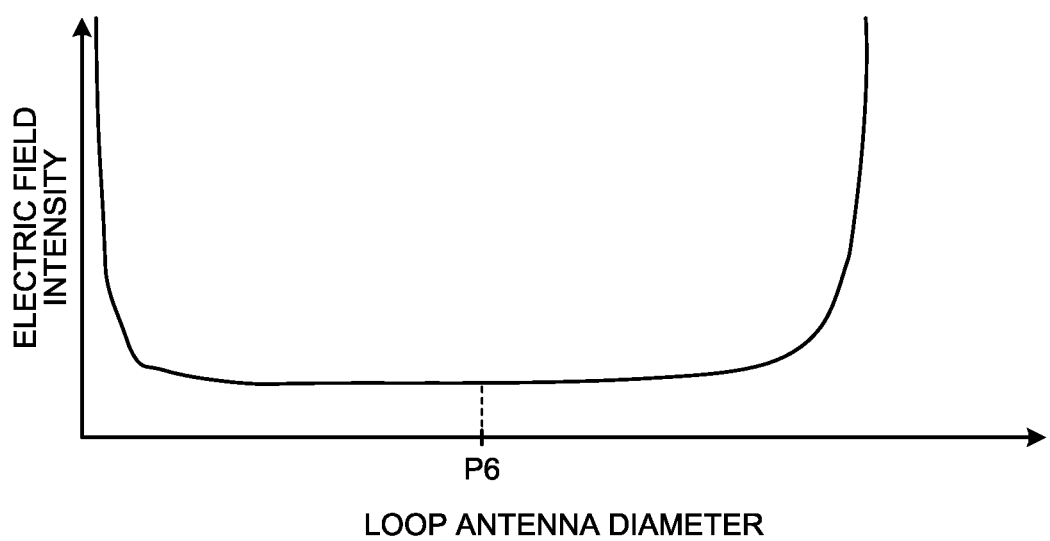
FIG. 10 is a diagram of a relation between an electric connection and electric field intensity of the loop antenna according to the embodiment.

FIG. 10 indicates electric field intensity when the first terminal 22a and the second terminal 22b are turned OFF in a configuration in which the first terminal 22a or the second terminal 22b is disposed at a position of $\lambda/16$ (24 mm) away from the circuit terminal 23a of the RFID detection circuit 23 in the direction in which the loop antenna 21 extends. According to FIG. 10, the loop antenna 21 exhibits electric field intensity having a value of 72.58 V/m at a center P6 of the line segment Q, which is greater than the electric field intensity values in the examples of FIGS. 6 to 9. This is because the loop antenna 21 is brought into the disconnected state by the switch circuit 22 at a position farther away from the circuit terminal 23a of the RFID detection circuit 23 than in the examples of FIGS. 6 to 9.

Figure 11:
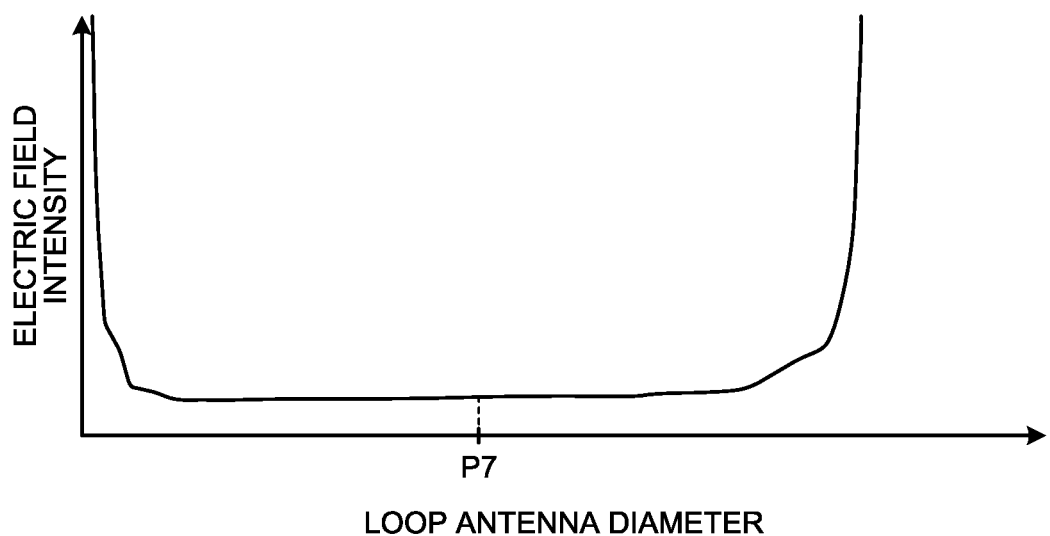
FIG. 11 is a diagram of a relation between an electric connection and electric field intensity of the loop antenna according to the embodiment.

FIG. 11 indicates electric field intensity when the first terminal 22a and the second terminal 22b are turned OFF in a configuration in which the first terminal 22a or the second terminal 22b is disposed at a position of $\lambda/8$ (48 mm) away from the circuit terminal 23a of the RFID detection circuit 23 in the direction in which the loop antenna 21 extends. According to FIG. 11, the loop antenna 21 exhibits electric field intensity having a value of 102.77 V/m at a center P7 of the line segment Q, which is greater than the electric field intensity values in the examples of FIGS. 6 to 10. This is because the loop antenna 21 is brought into the disconnected state by the switch circuit 22 at a position farther away from the circuit terminal 23a of the RFID detection circuit 23 than in the examples of FIGS. 6 to 10.

Figure 12:
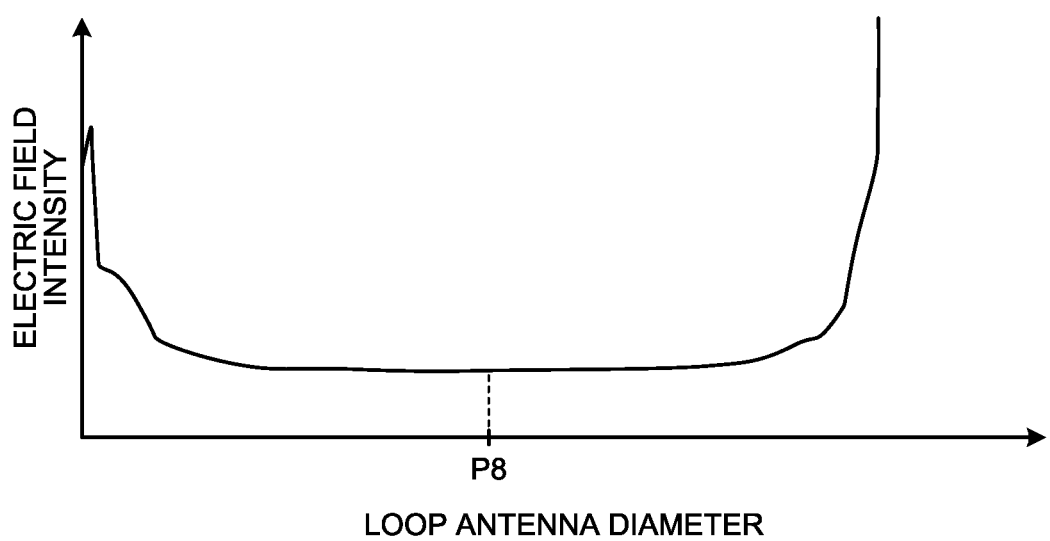
FIG. 12 is a diagram of a relation between an electric connection and electric field intensity of the loop antenna according to the embodiment.

FIG. 12 indicates electric field intensity when the first terminal 22a and the second terminal 22b are turned OFF in a configuration in which the first terminal 22a or the second terminal 22b is disposed at a position of $\lambda/4$ (96 mm) away from the circuit terminal 23a of the RFID detection circuit 23 in the direction in which the loop antenna 21 extends. According to FIG. 12, the loop antenna 21 exhibits electric field intensity having a value of 126.43 V/m at a center P8 of the line segment Q, which is greater than the electric field intensity values in the examples of FIGS. 6 to 11. This is because the loop antenna 21 is brought into the disconnected state by the switch circuit 22 at a position farther away from the circuit terminal 23a of the RFID detection circuit 23 than in the examples of FIGS. 6 to 11.

As described above, the simulation results indicated in FIGS. 5 to 12 reveals that the electric field intensity is the greatest when the loop antenna 21 is electrically connected with the RFID detection circuit 23 as illustrated in FIG. 5. It is further known that the electric field intensity is the smallest in the configuration in which the first terminal 22a and the second terminal 22b are disposed (disconnected stale) between the circuit terminal 23a of the RFID detection circuit 23 and the starting end 21a of the loop antenna 21, as illustrated in FIG. 6. It is further known that, as illustrated in FIGS. 7 to 12, the electric field intensity increases at greater distances of the first terminal 22a and the second terminal 22b (disconnected state) spaced away from the circuit terminal 23a of the RFID detection circuit 23 in the direction in which the loop antenna 21 extends. The simulation results indicated in FIGS. 5 to 12 reveal that the configuration in which the first terminal 22a or the second terminal 22b is disposed at a position of $\lambda/32$ (12 mm) away from the circuit terminal 23a of the RFID detection circuit 23 in the direction in which the loop antenna 21 extends achieves a maximum gain reduction range K permissible in terms of reduction of the gain of the loop antenna 21, because it is effective to dispose the first terminal 22a and the second terminal 22b to positions at which the electric field intensity when the switch circuit 22 is turned OFF is about ¼ of the electric field intensity (135.64 V/m indicated in FIG. 5) when the loop antenna 21 is electrically connected with the detection device 20. Thus, the switch circuit 22 turns OFF the connection between the RFID detection circuit 23 and the loop antenna 21 within the gain reduction range K that extends from the circuit terminal 23a of the RFID detection circuit 23 to a position of λ/32 (12 mm) away from the circuit terminal 23a of the RFID detection circuit 23 in the direction in which the loop antenna 21 extends.

When, for example, an external force applied by an operation performed by the occupant, as the object to be detected, is applied, the switch circuit 22 has the first terminal 22a and the second terminal 22b set to a first position out of two positions of ON and OFF. When the external force applied by the operation performed by the occupant is not applied, the switch circuit 22 has the first terminal 22a and the second terminal 22b set to a second position out of the two positions of ON and OFF. In the first embodiment, the switch circuit 22 is turned ON when the external force is applied and turned OFF when the external force is not applied (momentary operation). When, for example, the occupant sits on the seat 2a, the switch circuit 22 is turned ON by pressure of the occupant. When the occupant does not sit in the seat 2a, the switch circuit 22 is released from the pressure of the occupant and is turned OFF.

The RFID detection circuit 23 outputs a detection signal. The detection signal includes an identifier (e.g., a number and a code) that is assigned to each detection device 20 and varies from one detection device 20 to another. The RFID detection circuit 23 is driven by power derived from the power supply signal transmitted from the RFID reader 10 and generates the detection signal. The RFID detection circuit 23 includes, for example, the circuit terminal 23a, the circuit terminal 23b, a rectifier circuit 23c, a storage 23d, and an IC circuit 23e. The circuit terminal 23a and the circuit terminal 23b are electrically connected with an external device. The circuit terminal 23a is connected with the first terminal 22a of the switch circuit 22. The circuit terminal 23b is connected with the terminating end 21b of the loop antenna 21. The rectifier circuit 23c is connected with the loop antenna 21 via the switch circuit 22. The rectifier circuit 23c rectifies alternating current power (power supply signal) output from the loop antenna 21 to thereby generate direct current power. The rectifier circuit 23c is connected with the storage 23d and the IC circuit 23e. The rectifier circuit 23c supplies the generated direct current power to the storage 23d and the IC circuit 23e via a smoothing circuit not illustrated.

The storage 23d stores therein the identifier that varies from one detection device 20 to another. The storage 23d is connected with the IC circuit 23e to thereby allow the IC circuit 23e to refer to the identifier.

The IC circuit 23e is connected with the storage 23d and the loop antenna 21. The IC circuit 23e acquires the identifier stored in the storage 23d and outputs the detection signal having a carrier wave modulated with the acquired identifier to the loop antenna 21 via the switch circuit 22.

The ECU 30 is an electronic circuit controlling generally the vehicle 2. The ECU 30 includes an electronic circuit incorporating mainly a well-known microcomputer that includes a CPU, a ROM and a RAM as storages, and an interface. Exemplarily, the ECU 30 is connected with the RFID reader 10 and determines the state of the object to be detected within the vehicle 2 with the detection signal received by the RFID reader 10. The ECU 30 associates the identifier included in the detection signal with the object to be detected within the vehicle 2 in advance. For example, the ECU 30 associates different identifiers with respective seats 2a of the vehicle 2. This arrangement enables the ECU 30 to determine the state of each seat 2a with the identifier. The ECU 30 controls the transmitter 11a so as to transmit a transmission signal including a power supply signal and a carrier wave at predetermined intervals (e.g., at intervals of 1 second) to each detection device 20.

Figure 13:
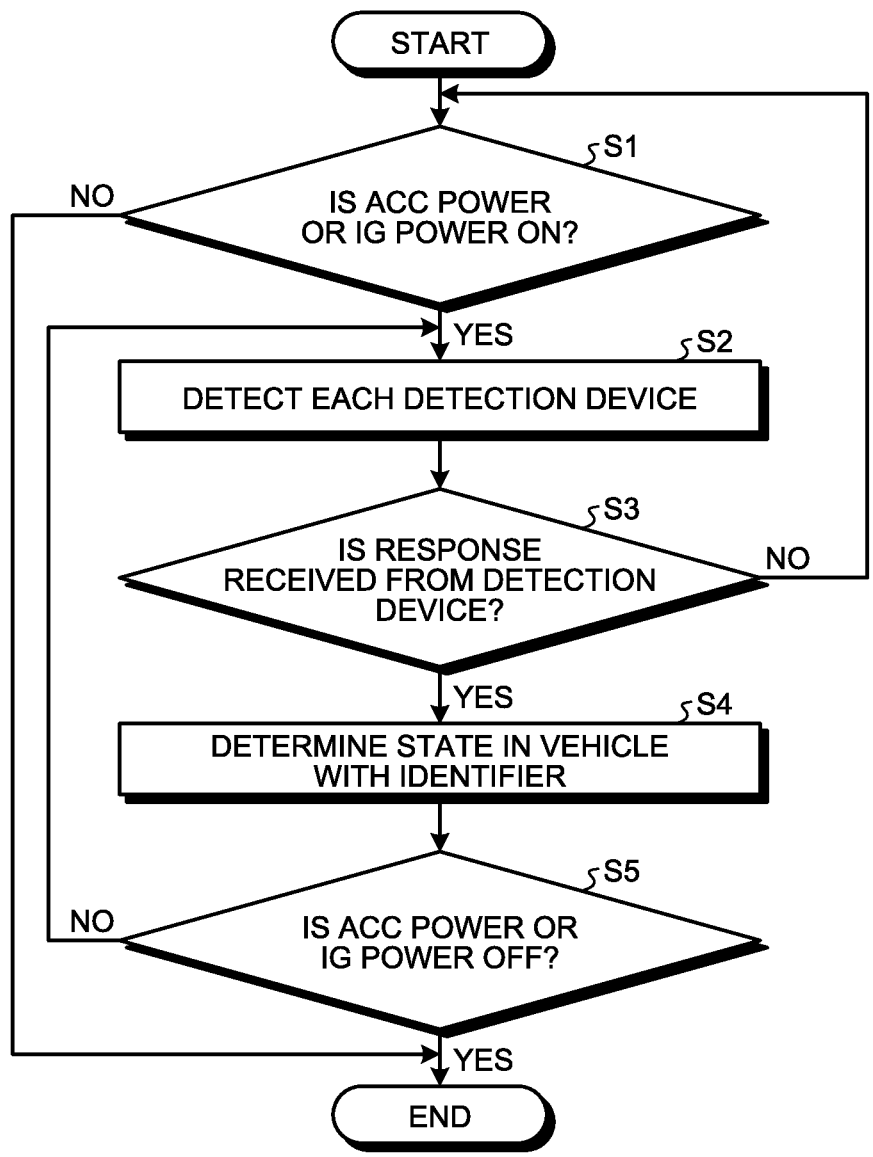
FIG. 13 is a flowchart of an exemplary operation of the detection system according to the embodiment.

The following describes, with reference to FIG. 13, exemplary operations of the detection system 1. The ECU 30 of the detection system 1 determines whether accessory (ACC) power or ignition (IG) power is ON (Step S1). When it is determined that the ACC power or the IG power is ON (Yes at Step S1), the ECU 30 uses the RFID reader 10 to detect each detection device 20 (Step S2). For example, the ECU 30 causes the RFID reader 10 to transmit the transmission signal including a power supply signal and a carrier wave at predetermined intervals (e.g., at intervals of 1 second) to each detection device 20. The ECU 30 then determines whether a response is received from the detection device 20 (Step S3). The detection device 20 is activated because the gain of the loop antenna 21 is not reduced, as a result of the RFID detection circuit 23 being electrically connected with the loop antenna 21 when the switch circuit 22 is ON. In this case, the detection device 20 transmits the detection signal from the RFID detection circuit 23 to the RFID reader 10 via the loop antenna 21. The detection device 20 is not activated because the gain of the loop antenna 21 is reduced, as a result of the RFID detection circuit 23 being electrically disconnected from the loop antenna 21 when the switch circuit 22 is OFF. In this case, the detection device 20 does not transmit the detection signal from the RFID detection circuit 23 to the RFID reader 10 via the loop antenna 21.

The RFID reader 10, upon receipt of the detection signal from the detection device 20, outputs the identifier of the received detection signal to the ECU 30. The ECU 30 determines that a response has been received from the detection device 20 when the RFID reader 10 outputs an identifier. The ECU 30, having determined that a response has been received from the detection device 20 (Yes at Step S3), determines the state of the object to be detected within the vehicle 2 with the identifier (Step S4). For example, the ECU 30 determines that an occupant sits on the seat 2a that is associated with the identifier output from the RFID reader 10. The ECU 30 next determines whether the ACC power or the IG power is OFF (Step S5). When it is determined that the ACC power or the IG power is OFF (Yes at Step S5), the ECU 30 terminates the process. When it is determined that the ACC power or the IG power is ON (No at Step S5), the ECU 30 returns to Step S2 and uses the RFID reader 10 to detect each detection device 20. When it is determined at Step S1 that the ACC power or the IG power is OFF (No at Step S1), the ECU 30 terminates the process. When it is determined at Step S3 that no response has been received from the detection device 20 (No at Step S3), the ECU 30 again uses the RFID reader 10 to detect each detection device 20 (Steps S1 and S2).

As described above, the detection device 20 in the first embodiment includes the loop antenna 21, the RFID detection circuit 23, and the switch circuit 22. The loop antenna 21 transmits and receives a radio wave including a signal. The RFID detection circuit 23 includes the circuit terminal 23a and the circuit terminal 23b. The circuit terminal 23a and the circuit terminal 23b are connected with the loop antenna 21. The RFID detection circuit 23 is activated with power derived from the power supply signal included in the signal received by the loop antenna 21 and outputs the detection signal to the loop antenna 21. The switch circuit 22 switches, according to the state of the object to be detected, between the gain reduced state in which the gain of the loop antenna 21 is reduced and the gain unreduced state in which the gain of the loop antenna 21 is not reduced. The switch circuit 22 has the first point of action 22c and the second point of action 22d for reducing the gain of the loop antenna 21, when λ is the wavelength of the radio wave, the first point of action 22c and the second point of action 22d are located within the gain reduction range K that represents a range on the loop antenna 21 from the circuit terminal 23a to the position of λ/32 away from the circuit terminal 23a in the direction in which the loop antenna 21 extends.

Through the foregoing arrangements, the detection device 20 turns OFF the switch circuit 22 to thereby allow a mismatch state of antenna matching to develop between the RFID detection circuit 23 and the loop antenna 21. The detection device 20 turns ON the switch circuit 22 to thereby allow a match state of antenna matching to develop between the RFID detection circuit 23 and the loop antenna 21. When the antenna matching of the loop antenna 21 is in a match state, the detection device 20 can transmit and receive signals via the loop antenna 21 because the reception sensitivity is not reduced. When the antenna matching is in a mismatch state, the detection device 20 can arrange not to transmit and receive signals via the loop antenna 21 because the reception sensitivity is reduced. The detection device 20, because of reducing the gain of the loop antenna 21 near the RFID detection circuit 23, can effectively reduce the gain of the loop antenna 21. This reduction enables the detection device 20 to accurately set so as not to transmit or receive signals via the loop antenna 21. As a result, the detection device 20 can accurately detect change in the state of the object to be detected within the vehicle 2 to thereby enhance detection accuracy. In addition, the detection device 20 eliminates the need for a power supply wire and thus can save wires. Additionally, because a wireless module is completed within the seat 2a, the detection device 20 can improve assemblability with respect to the seat 2a.

In the detection device 20, the switch circuit 22 is disposed in the vehicle 2 and switches between the gain reduced state and the gain unreduced state according to the state of the object to be detected within the vehicle 2. This arrangement results in the following. When, for example, the detection devices 20 are disposed in the respective seats 2a of the vehicle 2, each of the detection devices 20 can detect the operation of the occupant through seating by the occupant in the vehicle 2.

In the detection device 20, the switch circuit 22 allows the first point of action 22c and the second point of action 22d to be mutually switched between an electrically connected state and an electrically disconnected state. The switch circuit 22 can switch between the gain unreduced state in which the first point of action 22c and the second point of action 22d are in the connected state and the gain reduced state in which the first point of action 22c and the second point of action 22d are in the disconnected state. Through the foregoing arrangements, the detection device 20 can make antenna matching mismatch between the RFID detection circuit 23 and the loop antenna 21. This mismatch state allows the detection device 20 not to activate the RFID detection circuit 23 because of reduced reception sensitivity. The detection device 20 can also make antenna matching match between the RFID detection circuit 23 and the loop antenna 21. This match state allows the detection device 20 to activate the RFID detection circuit 23 because of the unreduced reception sensitivity.

In the detection device 20, the switch circuit 22 includes the first terminal 22a and the second terminal 22b. The first terminal 22a is connected with the first point of action 22c. The second terminal 22b is connected with the second point of action 22d. The switch circuit 22 directly connects the first point of action 22c with the first terminal 22a and directly connects the second point of action 22d with the second terminal 22b. The foregoing arrangements allow the detection device 20 to have a simple configuration.

The detection system 1 in the first embodiment includes the RFID reader 10, the detection device 20, and the ECU 30. The RFID reader 10 transmits and receives radio waves including signals and at least transmits a transmission signal including a power supply signal. The detection device 20 includes the loop antenna 21, the RFID detection circuit 23, and the switch circuit 22. The loop antenna 21 transmits and receives signals to and from the RFID reader 10. The RFID detection circuit 23 is activated with power derived from the power supply signal included in the transmission signal received by the loop antenna 21 and outputs the detection signal to the loop antenna 21. The switch circuit 22 switches between the gain reduced state in which the gain of the loop antenna 21 is reduced and the gain unreduced state in which the gain of the loop antenna 21 is not reduced, according to the state of the object to be detected. The ECU 30 is connected with the RFID reader 10 and, on the basis of the detection signal received by the RFID reader 10, determines the state of the object to be detected. The switch circuit 22 has the first point of action 22c and the second point of action 22d. The first point of action 22c and the second point of action 22d are located within the gain reduction range K. Specifically, when λ is the wavelength of the radio wave, the gain reduction range K covers a range on the loop antenna 21 from the circuit terminal 23a to the position of λ/32 away from the circuit terminal 23a in the direction in which the loop antenna 21 extends. The foregoing arrangements enable the detection system 1 to achieve an effect identical to the effect achieved by the detection device 20 described above.

First Modification

Figure 14:
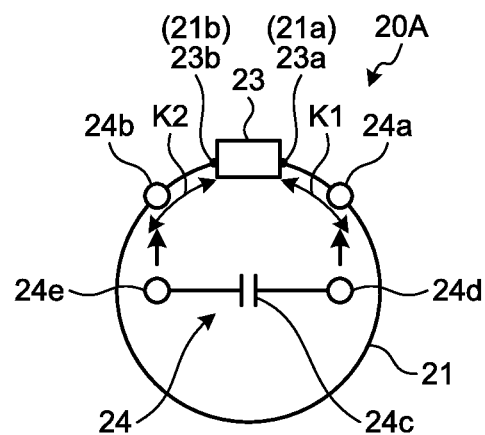
FIG. 14 is a schematic diagram of an exemplary configuration of a detection device according a first modification of the embodiment.

The following describes first to seventh modifications of the first embodiment. It is to be noted that, in the first to seventh modifications, like reference numerals designate identical or corresponding components and detailed descriptions therefor are omitted. A detection device 20A in the first modification differs from the detection device 20 in the first embodiment in that the detection device 20A includes a capacitor connection circuit (gain reduction circuit) 24 in place of the switch circuit 22 in the first embodiment. As illustrated in FIG. 14, the capacitor connection circuit 24 includes a capacitor 24c as an electronic device capable of reducing the gain of the loop antenna 21. It is noted that the loop antenna 21 has the starting end 21a connected with the circuit terminal 23a of the RFID detection circuit 23 and has the terminating end 21b connected with the circuit terminal 23b of the RFID detection circuit 23. The capacitor connection circuit 24 has a first point of action 24a and a second point of action 24b, with which the capacitor 24c is connected. The first point of action 24a and the second point of action 24b are disposed in a gain reduction range K1 and a gain reduction range K2, respectively, on the loop antenna 21. The first point of action 24a is disposed in the gain reduction range K1 that covers a range on the loop antenna 21 from the circuit terminal 23a of the RFID detection circuit 23 to a position of λ/32 away from the circuit terminal 23a in a first direction in which the loop antenna 21 extends. The second point of action 24b is disposed in the gain reduction range K2 that covers a range on the loop antenna 21 from the circuit terminal 23b of the RFID detection circuit 23 to a position of λ/32 away from the circuit terminal 23b in a second direction in which the loop antenna 21 extends, opposite to the first direction. The capacitor 24c has a first terminal 24d and a second terminal 24e. The first terminal 24d is disposed on a first side of the capacitor 24c. The second terminal 24e is disposed on a second side of the capacitor 24c. Depending on the state of the object to be detected within the vehicle 2, the capacitor connection circuit 24 electrically connects the first terminal 24d with the first point of action 24a on the side of the loop antenna 21 and electrically connects the second terminal 24e with the second point of action 24b on the side of the loop antenna 21. By having the capacitor 24c connected with the first point of action 24a or the second point of action 24b on the side of the loop antenna 21 depending on the state of the object to be detected within the vehicle 2 as described above, the capacitor connection circuit 24 reduces the gain of the loop antenna 21 to thereby make antenna matching mismatch between the loop antenna 21 and the RFID detection circuit 23. Meanwhile, the capacitor connection circuit 24 does not electrically connects the first terminal 24d of the capacitor 24c with the first point of action 24a of the loop antenna 21, or does not electrically connects the second terminal 24e of the capacitor 24c with the second point of action 24b of the loop antenna 21, depending on the state of the object to be detected within the vehicle 2. By having the capacitor 24c not connected with the loop antenna 21 depending on the state of the object to be detected within the vehicle 2 as described above, the capacitor connection circuit 24 does not reduce the gain of the loop antenna 21 to thereby make antenna matching match between the loop antenna 21 and the RFID detection circuit 23.

As described above, the detection device 20A in the first modification of the first embodiment includes the capacitor connection circuit 24. The capacitor connection circuit 24 can connect the capacitor 24c, which can reduce the gain of the loop antenna 21, with the first point of action 24a and the second point of action 24b. The capacitor connection circuit 24 can switch between the gain unreduced state in which the capacitor 24c is not connected with the first point of action 24a or the second point of action 24b and the gain reduced state in which the capacitor 24c is connected with the first point of action 24a and the second point of action 24b. Through the foregoing arrangements, the detection device 20A can make the antenna matching mismatch between the RFID detection circuit 23 and the loop antenna 21. This mismatch state allows the detection device 20A not to activate the RFID detection circuit 23 because of reduced reception sensitivity. The detection device 20A can also make the antenna matching match between the RFID detection circuit 23 and the loop antenna 21. This match state allows the detection device 20A to activate the RFID detection circuit 23 with the power supply signal from the RFID reader 10 because of the unreduced reception sensitivity.

Second Modification

Figure 15:
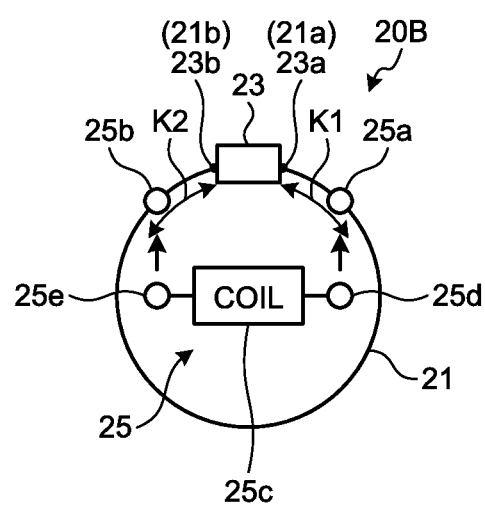
FIG. 15 is a schematic diagram of an exemplary configuration of a detection device according a second modification of the embodiment.

The following describes a second modification of the first embodiment. A detection device 20B in the second modification differs from the detection device 20 in the first embodiment in that the detection device 20B includes a coil connection circuit (gain reduction circuit) 25 in place of the switch circuit 22 in the first embodiment. As illustrated in FIG. 15, the coil connection circuit 25 includes a coil 25c as an electronic device capable of reducing the gain of the loop antenna 21. It is noted that the loop antenna 21 has the starting end 21a connected with the circuit terminal 23a of the RFID detection circuit 23 and has the terminating end 21b connected with the circuit terminal 23b of the RFID detection circuit 23. The coil connection circuit 25 has a first point of action 25a and a second point of action 25b, with which the coil 25c is connected. The first point of action 25a and the second point of action 25b are disposed in a gain reduction range K1 and a gain reduction range K2, respectively, on the loop antenna 21. The first point of action 25a is disposed in the gain reduction range K1 that covers a range on the loop antenna 21 from the circuit terminal 23a of the RFID detection circuit 23 to a position of λ/32 away from the circuit terminal 23a in a first direction in which the loop antenna 21 extends. The second point of action 25b is disposed in the gain reduction range K2 that covers a range on the loop antenna 21 from the circuit terminal 23b of the RFID detection circuit 23 to a position of λ/32 away from the circuit terminal 23b in a second direction in which the loop antenna 21 extends, opposite to the first direction. The coil 25c has a first terminal 25d and a second terminal 25e. The first terminal 25d is disposed on a first side of the coil 25c. The second terminal 25e is disposed on a second side of the coil 25c. Depending on the state of the object to be detected within the vehicle 2, the coil connection circuit 25 electrically connects the first terminal 25d of the coil 25c with the first point of action 25a on the side of the loop antenna 21 and electrically connects the second terminal 25e of the coil 25c with the second point of action 25b on the side of the loop antenna 21. By having the coil 25c connected with the loop antenna 21 depending on the state of the object to be detected within the vehicle 2 as described above, the coil connection circuit 25 reduces the gain of the loop antenna 21 to thereby make antenna matching mismatch between the loop antenna 21 and the RFID detection circuit 23. Meanwhile, the coil connection circuit 25 does not electrically connect the first terminal 25d of the coil 25c with the first point of action 25a of the loop antenna 21, or does not electrically connect the second terminal 25e of the coil 25c with the second point of action 25b of the loop antenna 21, depending on the state of the object to be detected within the vehicle 2. By having the coil 25c not connected with the loop antenna 21 depending on the state of the object to be detected within the vehicle 2 as described above, the coil connection circuit 25 does not reduce the gain of the loop antenna 21 to thereby make antenna matching match between the loop antenna 21 and the RFID detection circuit 23.

As described above, the detection device 20B in the second modification of the first embodiment includes the coil connection circuit 25. The coil connection circuit 25 can connect the coil 25c, which can reduce the gain of the loop antenna 21, with the first point of action 25a and the second point of action 25b. The coil connection circuit 25 can switch between the gain unreduced state in which the coil 25c is not connected with the first point of action 25a or the second point of action 25b and the gain reduced state in which the coil 25c is connected with the first point of action 25a and the second point of action 25b. Through the foregoing arrangements, the detection device 20B can make the antenna matching mismatch between the RFID detection circuit 23 and the loop antenna 21. This mismatch state allows the detection device 20B not to activate the RFID detection circuit 23 because of reduced reception sensitivity. The detection device 20B can also make the antenna matching match between the RFID detection circuit 23 and the loop antenna 21. This match state allows the detection device 20B to activate the RFID detection circuit 23 with the power supply signal from the RFID reader 10 because of the unreduced reception sensitivity.

Third Modification

Figure 16:
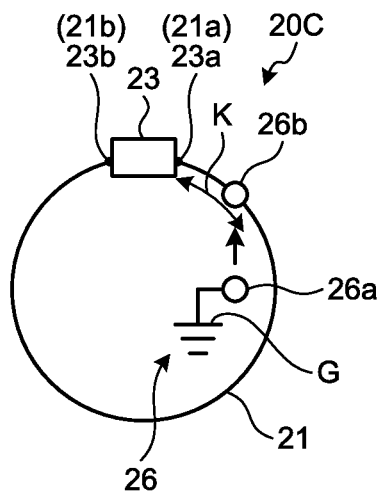
FIG. 16 is a schematic diagram of an exemplary configuration of a detection device according a third modification of the embodiment.

The following describes a third modification of the first embodiment. A detection device 20C in the third modification differs from the detection device 20 in the first embodiment in that the detection device 20C includes a ground connection circuit 26 in place of the switch circuit 22 in the first embodiment. It is noted that the loop antenna 21 has the starting end 21a connected with the circuit terminal 23a of the RFID detection circuit 23 and has the terminating end 21b connected with the circuit terminal 23b of the RFID detection circuit 23. As illustrated in FIG. 16, the ground connection circuit 26 has a ground connection terminal (point-of-action terminal) 26a and a point of action 26b. The ground connection terminal 26a provides a connection to a ground G. The point of action 26b can be connected with the ground connection terminal 26a. The point of action 26b is disposed in the gain reduction range K. The gain reduction range K covers a range on the loop antenna 21 from the circuit terminal 23a of the RFID detection circuit 23 to a position of $\lambda/32$ away from the circuit terminal 23a in the direction in which the loop antenna 21 extends. Depending on the state of the object to be detected within the vehicle 2, the ground connection circuit 26 electrically connects the ground connection terminal 26a with the point of action 26b on the side of the loop antenna 21. By having the ground G connected with the loop antenna 21 depending on the state of the object to be detected within the vehicle 2 as described above, the ground connection circuit 26 reduces the gain of the loop antenna 21 to thereby make antenna matching mismatch between the loop antenna 21 and the RFID detection circuit 23. Meanwhile, the ground connection circuit 26 does not connect the ground G with the loop antenna 21 depending on the state of the object to be detected within the vehicle 2 to thereby not reduce the gain of the loop antenna 21 and make antenna matching match between the loop antenna 21 and the RFID detection circuit 23.

As described above, the detection device 20C in the third modification of the first embodiment includes the ground connection circuit 26. The ground connection circuit 26 can connect the ground G with the point of action 26b. The ground connection circuit 26 can switch between the gain unreduced state in which the ground G is not connected with the point of action 26b and the gain reduced state in which the ground G is connected with the point of action 26b. Through the foregoing arrangements, the detection device 20C can make the antenna matching mismatch between the RFID detection circuit 23 and the loop antenna 21. This mismatch state allows the detection device 20C not to activate the RFID detection circuit 23 because of reduced reception sensitivity. The detection device 20C can also make the antenna matching match between the RFID detection circuit 23 and the loop antenna 21. This match state allows the detection device 20C to activate the RFID detection circuit 23 with the power supply signal from the RFID reader 10 because of the unreduced reception sensitivity.

Fourth Modification

Figure 17:
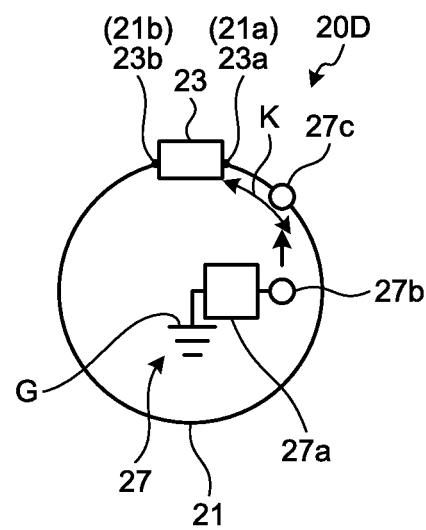
FIG. 17 is a schematic diagram of an exemplary configuration of a detection device according a fourth modification of the embodiment.
Figure 18:
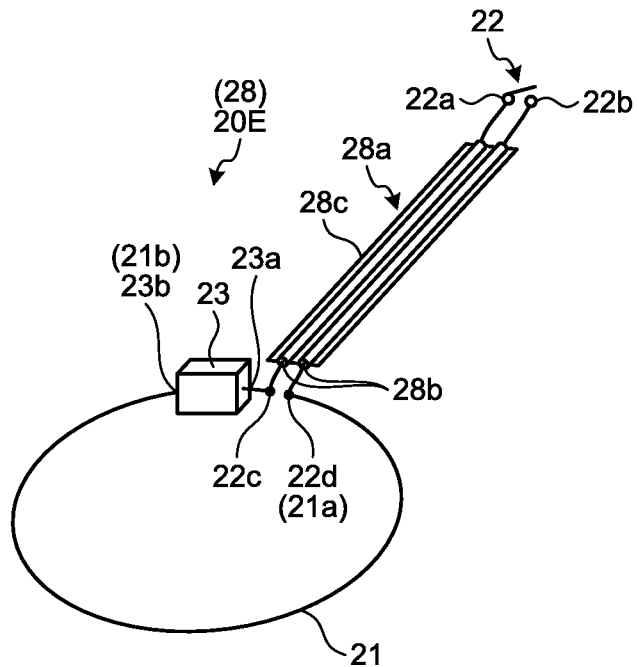
FIG. 18 is a schematic diagram of an exemplary configuration of a detection device according a fifth modification of the embodiment.
Figure 19:
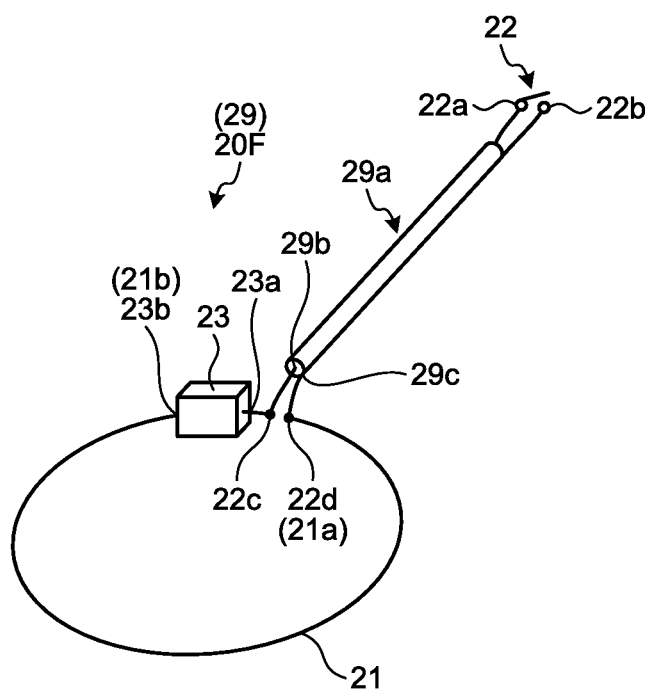
FIG. 19 is a schematic diagram of an exemplary configuration of a detection device according a sixth modification of the embodiment.

The following describes a fourth modification of the first embodiment. A detection device 20D in the fourth modification differs from the detection device 20 in the first embodiment in that the detection device 20D includes a ground connection circuit 27 in place of the switch circuit 22 in the first embodiment. It is noted that the loop antenna 21 has the starting end 21a connected with the circuit terminal 23a of the RFID detection circuit 23 and has the terminating end 21b connected with the circuit terminal 23b of the RFID detection circuit 23. As illustrated in FIG. 17, the ground connection circuit 27 includes a device group 27a and has a ground connection terminal (point-of-action terminal) 27b and a point of action 27c. The device group 27a includes a capacitor, a coil, and a resistor that can reduce gain of the loop antenna 21. The ground connection terminal 27b provides a connection to a ground G via the device group 27a. The point of action 27c can be connected with the ground connection terminal 27b. The point of action 27c is disposed in the gain reduction range K. The gain reduction range K covers a range on the loop antenna 21 from the circuit terminal 23a of the RFID detection circuit 23 to a position of $\lambda/32$ away from the circuit terminal 23a in the direction in which the loop antenna 21 extends. Depending on the state of the object to be detected within the vehicle 2, the ground connection circuit 27 electrically connects the ground connection terminal 27b with the point of action 27c on the side of the loop antenna 21. By having the ground G connected with the loop antenna 21 via the device group 27a depending on the state of the object to be detected within the vehicle 2 as described above, the ground connection circuit 27 effectively reduces the gain of the loop antenna 21 to thereby make antenna matching mismatch between the loop antenna 21 and the RFID detection circuit 23. Meanwhile, the ground connection circuit 27 does not connected the ground G with the loop antenna 21 via the device group 27a depending on the state of the object to be detected within the vehicle 2 to thereby not reduce the gain of the loop antenna 21 and make antenna matching match between the loop antenna 21 and the RFID detection circuit 23.

As described above, the detection device 20D in the fourth modification of the first embodiment includes the ground connection circuit 27. The ground connection circuit 27 can connect the ground G with the point of action 27c via the device group 27a. The ground connection circuit 27 can switch between the gain unreduced state in which the ground G is not connected with the point of action 27c and the gain reduced state in which the ground G is connected with the point of action 27c via the device group 27a. Through the foregoing arrangements, the detection device 20D can effectively make the antenna matching mismatch between the RFID detection circuit 23 and the loop antenna 21. This mismatch state allows the detection device 20D not to activate the RFID detection circuit 23 because of reduced reception sensitivity. The detection device 20D can also make the antenna matching match between the RFID detection circuit 23 and the loop antenna 21. This match state allows the detection device 20D to activate the RFID detection circuit 23 with the power supply signal from the RFID reader 10 because of the unreduced reception sensitivity.

Fifth Modification

The following describes a fifth modification of the first embodiment. A detection device 20E in the fifth modification differs from the detection device 20 in the first embodiment in that the switch circuit 22 is connected with the loop antenna 21 via a wire 28a. A switch unit 28 as a gain reduction unit includes the wire 28a and the switch circuit 22. The wire 28a includes, for example, two conductors 28b and jackets 28c. The two conductors 28b are juxtaposed to each other. The jackets 28c cover the respective conductors 28b. The conductors 28b are each formed to have, for example, a circular or flat sheet cross section. The conductors 28b each constitute a current path through which a current flows. The conductors 28b have first ends connected with a first point of action 22c and a second point of action 22d, respectively, of the loop antenna 21 and extend therefrom in directions in which the conductors 28b extend. The conductors 28b each have a length of, for example, a multiple of λ/2; however, the length is not limited thereto. A first terminal 22a and a second terminal 22b, as point-of-action terminals of the switch circuit 22, are connected with ends of the conductors 28b opposite to the first point of action 22c and the second point of action 22d, respectively. The conductors 28b are disposed adjacent to each other in a direction orthogonal to the directions in which the conductors 28b extend. The conductors 28b, being disposed adjacent to each other, each cause part of a magnetic flux produced by the current flowing through each current path to be canceled each other. More specifically the conductors 28b mutually cancel the magnetic fluxes because a current flowing direction of the current path of one of the conductors 28b is opposite to that of the current path of the other conductor 28b.

As described above, in the detection device 20E in the fifth modification of the first embodiment, the switch circuit 22 includes the first terminal 22a and the second terminal 22b. The first terminal 22a and the second terminal 22b are connected with the first point of action 22c and the second point of action 22d, respectively. The switch unit 28 includes the wire 28a. The wire 28a can connect the first point of action 22c and the second point of action 22d with the first terminal 22a and the second terminal 22b, respectively. The switch unit 28 can switch between the gain reduced state or the gain unreduced state through the switch circuit 22 on a side opposite to the first point of action 22c and the second point of action 22d of the wire 28a. The wire 28a includes a plurality of current paths. At least part of the magnetic fluxes produced by the currents flowing through the current paths is canceled each other. The foregoing arrangements results, in the detection device 20E, in the switch circuit 22 being connected with the loop antenna 21 via the wire 28a. The switch circuit 22 can thus be disposed away from the loop antenna 21, which improves a degree of freedom in design. Additionally, the detection device 20E can prevent the wire 28a from functioning as an antenna, so that effects from the wire 28a on antenna characteristics of the loop antenna 21 can be reduced.

Sixth Modification

The following describes a sixth modification of the first embodiment. A detection device 20F in the sixth modification differs from the detection device 20 in the first embodiment in that the switch circuit 22 is connected with the loop antenna 21 via a coaxial cable 29a. A switch unit 29 as a gain reduction unit includes the coaxial cable 29a and the switch circuit 22. The coaxial cable 29a serves as a wire. The coaxial cable 29a includes, for example, a core wire 29b, a shield braid 29c, and an insulator. The core wire 29b serves as an inner conductor. The shield braid 29c as a shielding member is disposed concentrically with the core wire 29b. The insulator insulates the core wire 29b from the shield braid 29c. In the coaxial cable 29a, the core wire 29b has a first end connected with a first point of action 22c of the loop antenna 21 and the shield braid 29c has a first end connected with a second point of action 22d of the loop antenna 21. The coaxial cable 29a extends from the first point of action 22c and the second point of action 22d of the loop antenna 21 in directions in which the coaxial cable 29a extends. The switch circuit 22 is connected with an end of the coaxial cable 29a on a side opposite to the first point of action 22c and the second point of action 22d. In the coaxial cable 29a, exemplarily, the core wire 29b has a second end connected with a first terminal 22a of the switch circuit 22 and the shield braid 29c has a second end connected with a second terminal 22b of the switch circuit 22. The coaxial cable 29a shields the magnetic flux with the shield braid 29c to thereby be prevented from serving as an antenna.

As described above, in the detection device 20F in the sixth modification of the first embodiment, the switch circuit 22 includes the first terminal 22a and the second terminal 22b. The first terminal 22a and the second terminal 22b are connected with the first point of action 22c and the second point of action 22d, respectively. The switch unit 29 includes the coaxial cable 29a. The coaxial cable 29a can connect the first point of action 22c and the second point of action 22d with the first terminal 22a and the second terminal 22b, respectively. The switch unit 29 can switch between the gain reduced state and the gain unreduced state with the switch circuit 22 on a side opposite to the first point of action 22c and the second point of action 22d of the coaxial cable 29a. The coaxial cable 29a includes the core wire 29b and the shield braid 29c. A current flows through the core wire 29b. The shield braid 29c shields a magnetic flux affecting the core wire 29b. The foregoing arrangements results, in the detection device 20F, in the switch circuit 22 being connected with the loop antenna 21 via the coaxial cable 29a. The switch circuit 22 can thus be disposed away from the loop antenna 21, which improves the degree of freedom in design. Additionally, the detection device 20F can prevent the coaxial cable 29a from functioning as an antenna, so that effects from the coaxial cable 29a on antenna characteristics of the loop antenna 21 can be reduced.

Seventh Modification

Figure 20:
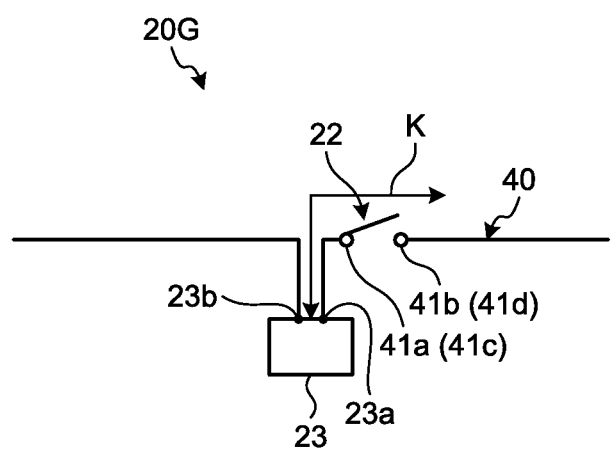
FIG. 20 is a schematic diagram of an exemplary configuration of a detection device according a seventh modification of the embodiment.

As an example, it has been illustrated that the loop antenna 21 is an antenna for each of the detection devices 20 to 20F; however, the antenna is not limited the example. The antenna for each of the detection devices 20 to 20F may be, for example, a dipole antenna, a monopole antenna, or an antenna with a modified dipole or monopole antenna. For example, a detection device 20G in a seventh modification includes, as illustrated in FIG. 20, a dipole antenna 40, a switch circuit 22, and an RFID detection circuit 23. The switch circuit 22 has a first point of action 41c and a second point of action 41d. The first point of action 41c and the second point of action 41d are located within the gain reduction range K to reduce the gain of the dipole antenna 40. Specifically, when λ is the wavelength of a radio wave received by the dipole antenna 40, the gain reduction range K covers a range on the dipole antenna 40 from the circuit terminal 23a of the RFID detection circuit 23 to a position of λ/32 away from the circuit terminal 23a in the direction in which the dipole antenna 40 extends. The switch circuit 22 includes a first terminal 41a and a second terminal 41b. The first terminal 41a is connected with the first point of action 41c and the second terminal 41b is connected with the second point of action 41d. The switch circuit 22 electrically turns ON or OFF the first terminal 41a and the second terminal 41b depending on the state of the object to be detected within the vehicle 2. The switch circuit 22, because bringing the RFID detection circuit 23 and the dipole antenna 40 into a disconnected state (OFF) near the RFID detection circuit 23, can effectively reduce the gain of the dipole antenna 40.

Each of the detection devices 20 has been described as being exemplarily mounted in the vehicle 2. This is, however, illustrative only and the detection devices 20 may be mounted in, for example, a ship, an aircraft, or a building.

As an example, it has been illustrated that, in the detection system 1 in the first embodiment, each of the detection devices 20 is disposed in the seat cushion 2b of the seat 2a to determine whether an occupant is seated thereon; however, the detection system 1 is not limited to the example. The detection device 20 may, for example, be disposed in a buckle (not illustrated) of the seat belt and the detection system 1 determines fastening of the seat belt by the occupant. In this case, the buckle exemplarily includes the loop antenna 21, the switch circuit 22, and the RFID detection circuit 23. Exemplarily, the switch circuit 22 turns the state OFF when a tongue plate of the seat belt is not mounted in the buckle and turns the state ON when the tongue plate is mounted in the buckle. When the seat belt is fastened, for example, the switch circuit 22 turns ON the first terminal 22a and the second terminal 22b to thereby bring the loop antenna 21 into the gain unreduced state, so that the RFID detection circuit 23 is activated. When the seat belt is not fastened, the switch circuit 22 turns OFF the first terminal 22a and the second terminal 22b to thereby bring the loop antenna 21 into the gain reduced state, so that the RFID detection circuit 23 is not activated. It is noted that the switch circuit 22 may switch ON or OFF when the seat belt is fastened, oppositely with respect to the foregoing example. Specifically, the switch circuit 22 may turn the state ON when the tongue plate of the seat belt is not mounted in the buckle and turn the state OFF when the tongue plate is mounted in the buckle. Additionally, the loop antenna 21 may be formed with a wire disposed in advance in the buckle for detecting fastening.

If the RFID detection circuit 23 is assembled in the buckle in the detection device 20, a flexible printed circuit (FPC) on which the RFID detection circuit 23 is mounted, for example, may be connected with a substrate of the switch circuit 22. In this case, the loop antenna 21 may be formed with a fastening detecting wire connected in advance with the substrate of the switch circuit 22.

Alternatively, an E-connector on which the RFID detection circuit 23 is mounted may be mounted on a seat belt fastening detecting connector disposed in advance in the buckle. In this case, the loop antenna 21 may be formed with a fastening detecting wire disposed in advance in the buckle. Additionally, a gain reduction unit for reducing the gain of the loop antenna 21 is disposed near the RFID detection circuit 23 of the E-connector.

An example described previously includes the switch circuit 22 connected with the first terminal 22a and the second terminal 22b via the wire 28a or the coaxial cable 29a. Other circuits may be configured similarly. For example, the capacitor connection circuit 24 may be connected with the first point of action 24a and the second point of action 24b via the wire 28a or the coaxial cable 29a.

As an example, it has been illustrated that, in the capacitor connection circuit 24, the first point of action 24a is disposed in the gain reduction range K1 and the second point of action 24b is disposed in the gain reduction range K2; however, the capacitor connection circuit 24 is limited to the example. For example, the capacitor connection circuit 24 may have both the first point of action 24a and the second point of action 24b disposed in either one of the gain reduction range K1 and the gain reduction range K2. This also applies to the coil connection circuit 25.

In the detection device according to the present embodiment, the gain reduction unit has the point of action for reducing the gain of the antenna, the point of action is located within the gain reduction range that extends from the terminal of the signal output unit to a position of λ/32 away from the terminal along the direction in which the antenna extends. The foregoing arrangement enables the detection device to reduce gain of the antenna near the signal output unit, so that the gain of the antenna can be effectively reduced for the enhanced detection accuracy.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A detection device, comprising:
an antenna that transmits and receives a radio wave including a signal;
a signal output unit that includes a circuit terminal connected with the antenna, the signal output unit being activated with power derived from a power supply signal included in the signal received by the antenna to output a detection signal to the antenna; and
a gain reduction unit that switches, according to a state of an object to be detected, between a gain reduced state in which a gain of the antenna is reduced and a gain unreduced state in which the gain of the antenna is not reduced, wherein
the gain reduction unit has a point of action for reducing the gain of the antenna, when λ is a wavelength of the radio wave, the point of action is located within a gain reduction range that represents a range on the antenna and that extends from the circuit terminal to a position of λ/32 away from the circuit terminal along a direction in which the antenna extends.

2. The detection device according to claim 1, wherein
the gain reduction unit includes a gain reduction circuit that allows a first point of action and a second point of action as the point of action to be mutually switched between an electrically connected state and an electrically disconnected state, and
the gain reduction circuit is able to switch between the gain unreduced state in which the first point of action and the second point of action are in the connected state and the gain reduced state in which the first point of action and the second point of action are in the disconnected state.

3. The detection device according to claim 1, wherein
the gain reduction unit includes a gain reduction circuit that is able to connect an electronic device capable of reducing the gain of the antenna with the point of action, and
the gain reduction circuit is able to switch between the gain unreduced state in which the electronic device is not connected with the point of action and the gain reduced state in which the electronic device is connected with the point of action.

4. The detection device according to claim 1, wherein
the gain reduction unit includes a gain reduction circuit that is able to connect a ground with the point of action, and
the gain reduction circuit is able to switch between the gain unreduced state in which the ground is not connected with the point of action and the gain reduced state in which the ground is connected with the point of action.

5. The detection device according to claim 2, wherein
the gain reduction circuit includes a point-of-action terminal to be connected with the point of action, and
the gain reduction unit directly connects the point of action with the point-of-action terminal.

6. The detection device according to claim 3, wherein
the gain reduction circuit includes a point-of-action terminal to be connected with the point of action, and
the gain reduction unit directly connects the point of action with the point-of-action terminal.

7. The detection device according to claim 4, wherein
the gain reduction circuit includes a point-of-action terminal to be connected with the point of action, and
the gain reduction unit directly connects the point of action with the point-of-action terminal.

8. The detection device according to claim 2, wherein
the gain reduction circuit includes a point-of-action terminal to be connected with the point of action,
the gain reduction unit includes a wire that is able to connect the point of action with the point-of-action terminal and the gain reduction unit is able to switch between the gain reduced state and the gain unreduced state on a side opposite to the point of action of the wire through the gain reduction circuit, and
the wire includes a plurality of current paths and at least part of magnetic fluxes produced by currents flowing through the current paths are canceled each other.

9. The detection device according to claim 3, wherein
the gain reduction circuit includes a point-of-action terminal to be connected with the point of action,
the gain reduction unit includes a wire that is able to connect the point of action with the point-of-action terminal and the gain reduction unit is able to switch between the gain reduced state and the gain unreduced state on a side opposite to the point of action of the wire through the gain reduction circuit, and
the wire includes a plurality of current paths and at least part of magnetic fluxes produced by currents flowing through the current paths are canceled each other.

10. The detection device according to claim 4, wherein
the gain reduction circuit includes a point-of-action terminal to be connected with the point of action,
the gain reduction unit includes a wire that is able to connect the point of action with the point-of-action terminal and the gain reduction unit is able to switch between the gain reduced state and the gain unreduced state on a side opposite to the point of action of the wire through the gain reduction circuit, and
the wire includes a plurality of current paths and at least part of magnetic fluxes produced by currents flowing through the current paths are canceled each other.

11. The detection device according to claim 2, wherein
the gain reduction circuit includes a point-of-action terminal to be connected with the point of action,
the gain reduction unit includes a wire that is able to connect the point of action with the point-of-action terminal and the gain reduction unit is able to switch between the gain reduced state and the gain unreduced state on a side opposite to the point of action of the wire through the gain reduction circuit, and
the wire includes a core wire through which a current flows and a shield that shields a magnetic flux affecting the core wire.

12. The detection device according to claim 3, wherein
the gain reduction circuit includes a point-of-action terminal to be connected with the point of action,
the gain reduction unit includes a wire that is able to connect the point of action with the point-of-action terminal and the gain reduction unit is able to switch between the gain reduced state and the gain unreduced state on a side opposite to the point of action of the wire through the gain reduction circuit, and
the wire includes a core wire through which a current flows and a shield that shields a magnetic flux affecting the core wire.

13. The detection device according to claim 4, wherein
the gain reduction circuit includes a point-of-action terminal to be connected with the point of action,
the gain reduction unit includes a wire that is able to connect the point of action with the point-of-action terminal and the gain reduction unit is able to switch between the gain reduced state and the gain unreduced state on a side opposite to the point of action of the wire through the gain reduction circuit, and
the wire includes a core wire through which a current flows and a shield that shields a magnetic flux affecting the core wire.

14. The detection device according to claim 1, wherein
the gain reduction unit is disposed in a vehicle and, according to a state of an object to be detected within the vehicle, switches between the gain reduced state and the gain unreduced state.

15. The detection device according to claim 2, wherein
the gain reduction unit is disposed in a vehicle and, according to a state of an object to be detected within the vehicle, switches between the gain reduced state and the gain unreduced state.

16. The detection device according to claim 3, wherein
the gain reduction unit is disposed in a vehicle and, according to a state of an object to be detected within the vehicle, switches between the gain reduced state and the gain unreduced state.

17. The detection device according to claim 4, wherein
the gain reduction unit is disposed in a vehicle and, according to a state of an object to be detected within the vehicle, switches between the gain reduced state and the gain unreduced state.

18. A detection system, comprising:
a reader that transmits and receives a radio wave including a signal and transmits a transmission signal including at least a power supply signal;
a detection device including:
an antenna that transmits and receives a signal to and from the reader;
a signal output unit including a circuit terminal connected with the antenna, the signal output unit being activated with power derived from the power supply signal included in the transmission signal received by the antenna to output a detection signal to the antenna; and
a gain reduction unit that switches, according to a state of an object to be detected, between a gain reduced state in which a gain of the antenna is reduced and a gain unreduced state in which the gain of the antenna is not reduced; and
a determiner that is connected with the reader and determines a state of the objected to be detected with the detection signal received by the reader, wherein
the gain reduction unit has a point of action for reducing the gain of the antenna, when $\lambda$ is a wavelength of the radio wave, the point of action is located within a gain reduction range that represents a range on the antenna and that extends from the circuit terminal to a position of $\lambda/32$ away from the circuit terminal along a direction in which the antenna extends.

* * * * *